May 4, 1926.

W. J. GROTENHUIS

AUTOMOBILE REAR BUMPER

Filed Jan. 7, 1926

1,582,980

Witness
Chas. R. Koursh

Inventor,
William J. Grotenhuis,
Attys.

Patented May 4, 1926.

1,582,980

UNITED STATES PATENT OFFICE.

WILLIAM J. GROTENHUIS, OF CHICAGO, ILLINOIS, ASSIGNOR TO BIFLEX PRODUCTS CORPORATION, OF WAUKEGAN, ILLINOIS, A CORPORATION OF DELAWARE.

AUTOMOBILE REAR BUMPER.

Application filed January 7, 1926. Serial No. 79,726.

*To all whom it may concern:*

Be it known that I, WILLIAM J. GROTENHUIS, a citizen of the United States of America, and a resident of Chicago, in the county of Cook and State of Illinois, have invented a certain new and useful Improvement in Automobile Rear Bumpers, of which the following is a specification.

This invention relates to improvements in automombile rear bumpers and more particularly to rear bumpers consisting of two connected wing or bumper members, adapted to be positioned on the vehicle on either side of the spare wheel or tire carried at the rear, and to extend laterally to protect the fenders and portions adjacent thereto.

The object of the invention is to provide a bumper construction of adequate strength to afford the required protection against collision damage, combined with a minimum of weight and with attractiveness of appearance.

A preferred embodiment of the invention is disclosed in the accompanying drawings in which.

Figure 1:
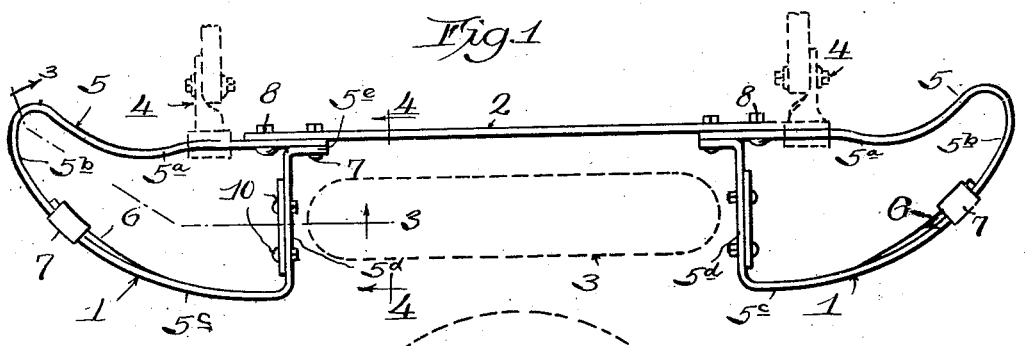
Figure 1 is a top plan view of the bumper.
Figure 2:
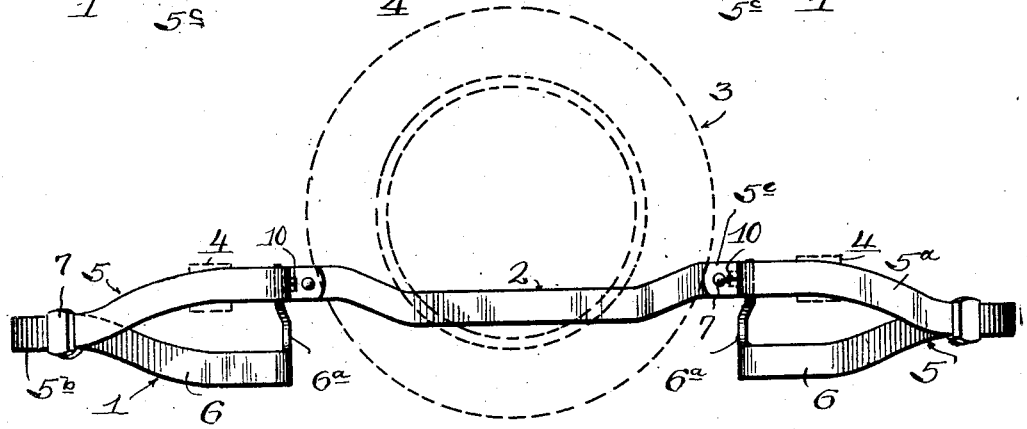
Figure 2 is a view in rear elevation showing the bumper with relation to the spare wheel.

Considering the bumper in its general aspects and the relationship of its parts to the vehicle on which it is mounted, the same consists of two bumper sections 1, 1, connected together by a single bar 2, offset rearwardly from the exposed or impact faces of said bumper sections to provide a space for the spare wheel or tire 3, which projects from the rear of the vehicle body. The bumper is attached to the vehicle by means of suitable brackets 4, 4 fixed to the ends of the vehicle frame members and clamped to the bumper sections 1, 1, on either side of the spare wheel with the ends of said bumper sections extending laterally from the points of attachment to protect the rear fenders.

Referring now more in detail to the construction of the bumper, it will be observed that the bumper sections 1, 1, are dropped or offset downwardly below the line of the connecting or intermediate bar 2, so that the protective or impact faces of said bumper sections extend below the points of attachment and likewise in a lower position than usual with respect to the spare tire 3. The purpose of this downward offset is twofold; it brings the bumper sections more into the line of other bumpers and parts of other vehicles that may be met in collision, thus affording more complete protection, and further it permits the bumper sections to be extended downwardly beneath the lower half circle of the spare wheel, thus affording a greater protective area than is ordinarily possible in this style of bumper.

The features of the invention therefore, pertain more especially to the construction of the bumper sections whereby the vertical offset feature is obtained without weakening the structure.

Each bumper section is a counterpart of the other and therefore a detailed description of one will suffice. Two bars, 5 and 6, of spring steel form each bumper section, one being a continuous bar bent into triangular shape, with the ends brought together for bolting connection with the end of the connecting bar 2, while the other bar 6 is relatively short and extends throughout a portion of the length of the continuous bar and is spaced vertically below it to form an area of increased width throughout the inner end of the bumper section. The general triangular shape of the main bar thus divides it into a front end portion $5^a$ extending outwardly in a general line with the connecting bar where it is bent into a U-shaped loop $5^b$ forming the outer extremity, and thence inwardly and rearwardly in a curved line to form the impact section 5ᶜ, and finally bent at a right angle toward the connecting bar to form the transverse inner end portion 5ᵈ, the extremity of this transverse portion being again bent at right angles to provide an end flange 5ᵉ bearing against the opposite end of the bar. A bolt 7 passes through these contacting ends, as well as through the connecting bar immediately behind, said connecting bar being extended outwardly beyond this point of connection and another bolt 8 extending through the rear end portion 5ᵃ and the connecting bar on the opposite side of the transverse portion 5ᵈ.

Figure 3:
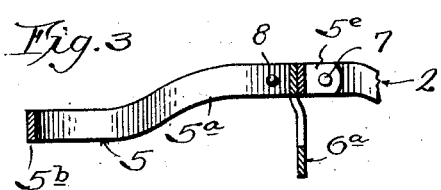
Figure 3 is an enlarged detail view of the end bumper sections as taken on line 3—3 of Figure 1.
Figure 4:
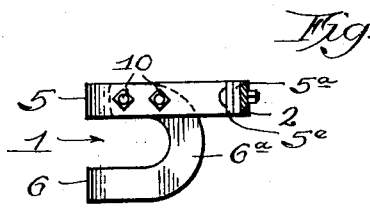
Figure 4 is an enlarged detail view taken on line 4—4 of Figure 1.

In addition to the shaping of the bar 5, as just described, it is also bent or offset in a vertical direction. Thus throughout the transverse portion 5ᵈ and the inner end portion of the impact section 5ᶜ the bar 5 and the connecting bar 2 are in the same plane, but as it approaches the outer end it curves downwardly, with the result that the end loop 5ᵇ is offset below the line of the connecting bar, as well as the points of attachment with the vehicle. In conformity with the curvature in the main bar, the auxiliary bar 6 is similarly offset so as to form a symmetrical area which converges as the bars approach each other, the auxiliary bar terminating in flatwise contact with the main bar just short of the looped end, where it is secured by a clamp 9. On the opposite side of the looped end 5ᵇ the front bar 5ᵃ is again offset, this being an upward curvature which brings it back into the line of the connecting bar just before the attaching bracket 4 is reached, as clearly shown in Figure 3.

To complete the structure the inner end of the auxiliary bar 6 is bent at right angles to conform to the main bar above, and then for a distance toward, but short of, the connecting bar 2, where it terminates in a broad U-shaped bend 6ᵃ curving upwardly and forwardly with its upper extremity lying in flatwise contact with the inner face of the transverse portion 5ᵈ of the main bar, it being necessary to offset the bar throughout the U-shaped bend in order to bring the two surfaces in contact. The bars being thus brought into contact, they are securely fastened by rivets 10, 10.

It will thus be observed that in dropping the entire structure of the end sections below the points of attachment with the vehicle frame the advantage of increased protection is secured without decreasing the strength of the bumper or sacrificing its impact absorbing qualities as a result of the novel treatment of the bars.

I claim as my invention:

1. In a bumper of the character described the combination of end bumper sections and an intermediate connecting bar, each of said sections comprising resilient bars bent to form a rigid looped frame, having a U-shaped outer end, a vertically disposed and widened impact area inwardly from said U-shaped end and offset in a vertical direction from said connecting bar.

2. In a bumper of the character described the combination of end bumper sections and an intermediate connecting bar, each of said sections comprising a main bar bent in substantially looped form to provide a U-shaped outer end portion and a transverse inner end portion extending at right angles to said connecting bar, and an auxiliary bar secured at its ends to said main bar inwardly from said U-shaped end portion and spaced vertically therefrom to provide an area of increased width.

3. In a bumper of the character described the combination of end bumper sections and an intermediate connecting bar, each of said sections comprising a main bar bent in substantially looped form to provide a U-shaped outer end portion, and an auxiliary bar secured at its ends to said main bar inwardly from said U-shaped end portion, the corresponding portions of said bars being vertically spaced to provide an area of increased width between their points of connection.

4. In a bumper of the character described the combination of end bumper sections adapted for attachment to the frame of a vehicle at their rear, and having rearwardly disposed impact receiving portions offset vertically from the portions thereof immediately adjacent the points of attachment with the vehicle, and a bar connecting said bumper sections together on a line with said points of attachment.

5. In a bumper of the character described the combination of bumper sections each consisting of a resilient bar bent to form a forwardly disposed attaching portion and a rearwardly disposed impact receiving portion, said bar being offset vertically throughout said impact receiving portion and an intermediate bar extending between said bumper sections and connected with the attaching portions thereof.

6. In a bumper of the character described the combination of end bumper sections and an intermediate connecting bar, each of said sections comprising resilient bars shaped to form a looped frame consisting of an impact receiving portion and a forwardly disposed portion adapted for attachment to a vehicle, said impact receiving portion including bars spaced apart vertically to provide an area of increased width inwardly from the outer end of said section and one of said bars offset vertically with respect to its point of connection with the vehicle.

7. In a bumper of the character described the combination with a vehicle having a spare wheel mounted at the rear thereof, of end sections mounted on the vehicle frame and extending outwardly substantially in the plane of said wheel, and each comprising resilient bars shaped to form a looped frame having an impact receiving portion consisting of two bars spaced apart vertically to provide an area of increased width adjacent said wheel, one of said bars being offset vertically to dispose said impact receiving portion substantially below the point of attachment with the vehicle.

Signed at Chicago, Ill., this 2nd day of January 1926.

WILLIAM J. GROTENHUIS.